(12) United States Patent
Bruun (10) Patent No.: US 7,490,108 B2
(45) Date of Patent: Feb. 10, 2009

(54) DATA CONSOLIDATION

(75) Inventor: Peter Michael Bruun, Rungsted Kyst (DK)

(73) Assignee: Hewlett-Packard Development Company, L.P., Houston, TX (US)

( * ) Notice: Subject to any disclaimer, the term of this patent is extended or adjusted under 35 U.S.C. 154(b) by 282 days.

(21) Appl. No.: 11/254,112

(22) Filed: Oct. 19, 2005

(65) Prior Publication Data

US 2007/0088756 A1 Apr. 19, 2007

(51) Int. Cl.
*G06F 7/00* (2006.01)
*G06F 12/00* (2006.01)
*G06F 17/30* (2006.01)

(52) U.S. Cl. .................. 707/200; 707/1; 707/2; 707/3; 707/4; 707/5; 707/202; 707/203; 707/204

(58) Field of Classification Search .................. 707/1–5, 707/202–204
See application file for complete search history.

(56) References Cited

U.S. PATENT DOCUMENTS

| | | | |
|---|---|---|---|
| 6,032,158 A * | 2/2000 | Mukhopadhyay et al. | 707/201 |
| 6,092,086 A * | 7/2000 | Martin et al. | 707/202 |
| 6,151,601 A * | 11/2000 | Papierniak et al. | 707/10 |
| 6,850,947 B1 * | 2/2005 | Chung et al. | 707/101 |
| 7,051,334 B1 * | 5/2006 | Porter et al. | 719/313 |
| 7,065,538 B2 * | 6/2006 | Aronoff et al. | 707/202 |
| 7,139,779 B1 * | 11/2006 | Kornelson et al. | 707/203 |
| 7,191,183 B1 * | 3/2007 | Goldstein | 707/101 |
| 7,321,904 B2 * | 1/2008 | Holenstein et al. | 707/201 |
| 2004/0205727 A1 * | 10/2004 | Sit et al. | 717/125 |
| 2004/0225670 A1 * | 11/2004 | Cameron et al. | 707/101 |
| 2004/0225763 A1 * | 11/2004 | Carroll et al. | 710/36 |
| 2004/0249644 A1 * | 12/2004 | Schiefer et al. | 705/1 |
| 2004/0267835 A1 * | 12/2004 | Zwilling et al. | 707/202 |
| 2005/0283357 A1 * | 12/2005 | MacLennan et al. | 704/4 |
| 2006/0277163 A1 * | 12/2006 | Schemer et al. | 707/3 |
| 2007/0011134 A1 * | 1/2007 | Langseth et al. | 707/1 |
| 2007/0016600 A1 * | 1/2007 | Bae et al. | 707/101 |

FOREIGN PATENT DOCUMENTS

WO WO 01/33386 A2 5/2001

* cited by examiner

*Primary Examiner*—James Trujillo
*Assistant Examiner*—Jorge A Casanova (57) ABSTRACT

A data consolidator is arranged to receive and process input data comprising: import data of a first type; and delta import data for transforming data of the first type, and provide output data comprising: export data of the first type; and delta export data for transforming data of the first type. The input data and output data optionally comprise so-called "full" and "delta" import data.

13 Claims, 8 Drawing Sheets

DATA CONSOLIDATION

FIELD OF THE INVENTION

This invention relates to a data consolidator, and to a method and computer program for processing data including data consolidation.

RELATED ART

The high complexity and extreme data volumes of an end-to-end consolidation component is of importance to Network Service Providers (NSPs) and within Telecommunications applications. Large Telecommunication Companies (Telcos) are often required to complete complex processing of Terabytes of data within a few hours every night. At present, this is not practically viable in one operation for the full multi national network, and so multi national Telcos are forced to operate in each country or region separately, requiring the establishment and maintenance of end-to-end data telecommunications trails across regional boundaries.

Currently, many enterprises with offices in different locations, for example London and Rome, cannot buy a fixed, guaranteed capacity, data connection to be set up between the offices, even though they use the same Telco in both countries, and even though that Telco is represented in every country between Britain and Italy.

If a Telco manages all connectivity in Europe in a single central repository, for example Berlin, then all the Terabytes of connection information from Europe must be brought to Berlin every night and put together to form coherent connectivity information. Any discrepancies between pieces of information coming from two network routers located in another region, for example the south of France, would need to be reconciled by network operations personnel located in Berlin.

The true complexity is even higher than the above example suggests, because there is not only geographical segmentation of the information, but also technological segmentation. Data transmission trails can span different network technologies such as Synchronous Digital Hierarchy (SDH), Asynchronous Transfer Mode (ATM), Multi-Protocol Label Switching (MPLS), etc., which are so complex that they each need different end-to-end consolidators and differently trained operators to manage them.

Because this Enterprise environment is massively heterogeneous, but still needs to operate on common data, there is a need to keep data consolidated and current in all the cooperating applications.

A data consolidator provides the functionality of taking input data from multiple sources and maintaining a single representation of the set of data, hereinafter referred to as "consolidated data". In addition, a consolidator may be able to transform or validate the input data. Further to these functions, it is also desirable for a consolidator to be able to replace or modify part or all of the consolidated data, in addition to being able to output data derived from the consolidated data to one or more recipients.

A consolidator with end-to-end consolidation provides the additional functionality of an algorithm which can receive consolidated data and/or input data as its input, and use output data from this algorithm as a source of input data to the consolidator unit.

Further to the above, a consolidator with reconciliation has the additional ability to define logical constraints on the consolidated data and ensure that the consolidated data satisfies the logical constraints. Input data that would cause a violation of the constraints may then cause reconciliation processes to be initiated, the reconciliation process consisting of a decision process and a handling process for the conflicting data, which handling process may discard or modify input data and/or consolidated data.

Existing consolidation solutions in this area are classified in three categories: EMS/NMS systems, Network Inventory Systems, and ETL products.

Element Management Systems (EMSs) and Network Management Systems (NMSs) are characterized by having one type of interface for collecting information from vendor specific network elements, and a different type of interface for exposing the consolidated information to Operations Support Systems (OSSs).

These solutions are not capable of generic stacking to multiple levels. In other words, they are designed to function as a single level of consolidation directly on top of the physical network infrastructure equipment (routers, gateways, load-balancers, firewalls, etc). Also, existing EMSs and NMSs do not have facilities for "reconciliation", that is, functions allowing humans or externally configurable automated processes to be notified of, and take action on discrepancies between input from different data sources and between input data and previously consolidated data.

Network Inventory Systems are based on generic database products. They are dedicated for network management purposes, and therefore may contain specialized functionality for reconciliation and end-to-end consolidation. Inventory Systems may have functions for ad hoc linking between different inventories, but they are designed to provide a single final inventory of a telecommunications network. The information contained in the inventory is available through query based interfaces, but network inventory systems are not capable of generic stacking to multiple levels.

ETL (Extract, Transform, and Load) products are designed as multi-purpose data warehouse consolidation engines. They provide functionality for high-speed data collection from a variety of sources, and for consolidating that information into a repository, which can then be queried. ETL products may be capable of distributing and replicating the consolidated repository geographically, but like Network Inventory products, the ETL products are not capable of generic stacking to multiple levels. ETL products have no dedicated functionality for managing the complex data models of telecommunications networks. Particularly, they lack reconciliation and end-to-end consolidation functions.

SUMMARY OF THE INVENTION

According to an aspect of the invention, there is provided a data consolidator arranged to receive and process input data comprising: import data of a first type; and delta import data for transforming data of the first type, and provide output data comprising: export data of the first type; and delta export data for transforming data of the first type.

According to another aspect of the invention, there is provided a method of processing data comprising: importing data of a first type; importing delta data for transforming data of the first type; consolidating the imported data; exporting consolidated data of the first type; and exporting delta data for transforming data of the first type.

The invention also provides a computer program comprising computer program code means for implementing the method of the invention.

According to yet another aspect of the invention, there is provided a data consolidator arrangement comprising first and second data consolidators of the first aspect of the invention, wherein the first data consolidator is interfaced with the second data consolidator such that the output data of the first consolidator is input to the second consolidator.

There is also provided a data consolidator, comprising: means for receiving input data comprising import data of a first type and delta import data for transforming data of the first type; means for consolidating the received input data; and means for providing output data comprising consolidated export data of the first type and delta export data for transforming data of the first type.

There is also provided a data consolidator comprising: a first input data path for full import data; a second input data path for delta import data; a first output data path for full export data; and a second output data path for delta export data.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

While the present invention is susceptible of embodiment in various forms, there are described and shown in the drawings presently preferred embodiments. These embodiments are provided so that this disclosure will be thorough and complete, and will fully convey the scope of the invention to those skilled in the art. Like reference numerals refer to like elements throughout.

Figure 1:
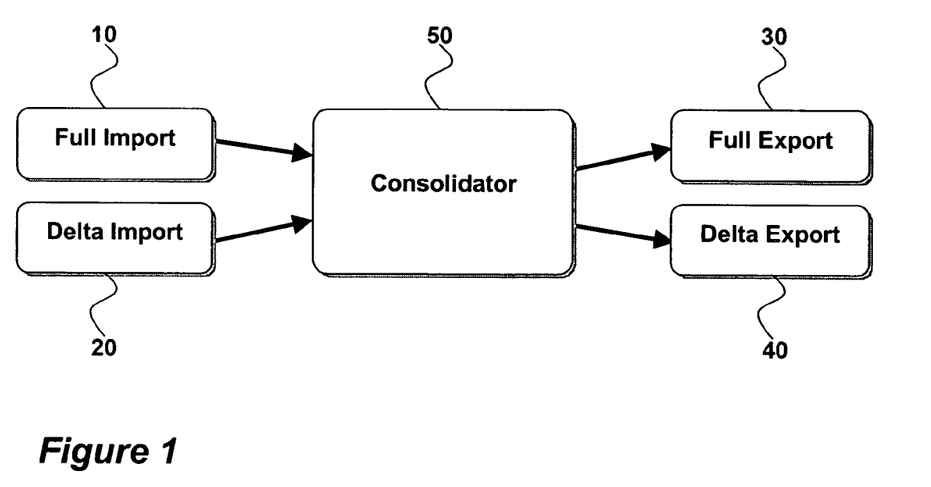
FIG. 1 shows a schematic diagram of a consolidator integration framework according to an embodiment of the invention.

Referring to FIG. 1, a schematic diagram of a data consolidator according to an embodiment of the invention is shown. The data consolidator 50 is adapted to support interface to data in the form of first to fourth data paths 10,20,30,40.

A data path is a specific path that data can follow in a given application integration framework. A data path is characterized by its direction, the communication protocol, and the kind of data it conveys. A data path can be unidirectional or bidirectional. The term is used broadly to cover any kind of actual mechanism, style or paradigm by which a data transfer could be implemented or initiated.

Mechanisms define the actual technology used to implement the integration, for example Extensible Markup Language (XML) over HyperText Transfer Protocol (HTTP), Common Object Request Broker Architecture (CORBA), Real-time Transport Protocol (RPC), etc. Styles define the general way information flow is controlled and handled, for example request-reply, publish-subscribe, event-driven, or batch-oriented.

Integrations paradigms define the broad conceptual ways of thinking about integrations and, although the integration paradigm used here is message-oriented, the implementation of the invention may be based on any such suitable integration paradigm, for example procedural or object oriented paradigms.

The consolidator is arranged to support the input of data and provide output data. The input data comprises import data of a first type, and delta import data for the transformation of data of the first type. The output data comprises export data of the first type, and delta export data for the transformation of data of the first type.

By 'type' it is meant the format, structure or inventory of data, for example. Thus, purely by way of an example, data of the same type may be webpage data, service usage data or inventory data. Thus, the consolidator is designed to process data for a particular application, and the four data paths relate to data which forms part of the particular application. The import/export data may be so-called full import/export data whereas the delta data is for the transformation (for example updating, replacement, removal) of part (a sub-set) of the full data.

In one example, the first data path 10 is an XML message-oriented data path arranged to interface with the consolidator 50. The first data path 10 conveys a data stream containing full imports from different applications or consolidators.

A full importexport comprises a complete set of data which replaces old data. The full data set can represent the entire consolidated data set, or a segment of that data, identified by some well-defined criteria. For example, a full export could be transmitted from a first region in a country, to be received as a full import at a second region and replace all known data about the first region, while leaving data for other regions unchanged. A full importexport may be characterized as a set of objects to be loaded as a single transaction, and pre-empting any previously existing objects within a well-defined scope/segmentidomain.

The second data path 20 is an XML message-oriented data path arranged to interface with the consolidator 50 and convey a data stream containing delta imports from different applications or consolidators.

A delta importexport comprises a set of data, which can transform old data into new data. For example, a delta importexport could be an insertion, update, or deletion of an individual object or attribute, or it could be a collection of such updates. Thus, the delta data is used to transform the data of a full import (or export) data set. Delta imports/exports must be applied in a specific sequence in order to produce the correct new data.

The third data path 30 is an XML message-oriented data path arranged to interface with the consolidator 50 and convey a data stream containing full exports to different applications or consolidators.

The fourth data path 40 is an XML message-oriented data path arranged to interface with the consolidator 50 and convey a data stream containing delta exports to different applications or consolidators.

As one example of the type of data to be processed by the consolidator, the full data can comprise network topology data for a full network, or for a domain of a network. This topology data provides hardware information, for example concerning network nodes, routers, the location of other network equipment and the physical links, as well as software information such as logical links ("trails") and other programs operated by the network elements. The topology information can include local topologies such as ring structures, VPNs, the customer end ports and equipment.

The delta data can then comprise local data for updating the full global topology data set, to reflect changes in local network topology, configuration, client equipment, software capabilities etc. Thus, the full data set is of a type which concerns network topology, configuration and capability, and the delta data is data for transforming the full data set to update information concerning the network topology, configuration and capability in a more localised area.

There are many other examples of data suitable for data consolidation using the same principles.

The consolidator 50 is constructed from configurable functional components and databases and may use the same configurable framework as existing ISM service controllers. Thus, the functionality explained with reference to FIG. 1 can be provided by software modification to the functional operation of a hardware framework, the hardware framework essentially comprising processors and databases.

Thus, this example of the invention allows the components to be implemented using commercial-off-the-shelf (COTS) products or a library of re-usable assets, for example network inventory products or ETL products. It should therefore be appreciated that any such suitably mapped components and databases may be used in order to realize the consolidator 50, for example a set of Java based framework components from an existing ISM architecture.

It will therefore be appreciated the consolidator 50 may be implemented using a server computer with components implemented using software and/or hardware. Alternatively, the consolidator 50 may be implemented as a software program with the components incorporated into the program code using appropriate mapping or wrapping techniques.

The consolidator can take advantage of any mixture of full, delta, and query based interfaces to optimize data volume handling. There is therefore provided a consolidator system that can be integrated with other COTS consolidation products, such as the Cramer® SyncEngine product for example, and coordinate interaction between full and delta data loads.

The import data paths 10,20 support the export paths of other network applications or consolidators, and the export data paths 30,40 support the import paths of other network applications or consolidators. Consequently, the data paths enable stacking in a distributed consolidation model, realizing a hierarchical style consolidation paradigm.

Multiple levels of regional management, consolidation and reconciliation can be implemented. This is not possible with existing centralized consolidation solutions. Examples of the invention are also able to integrate with new and legacy customer applications while remaining open to the existing consolidator functionality of external products. Furthermore, the consolidator may provide the functionality of end-to-end consolidation and/or reconciliation.

Figure 2:
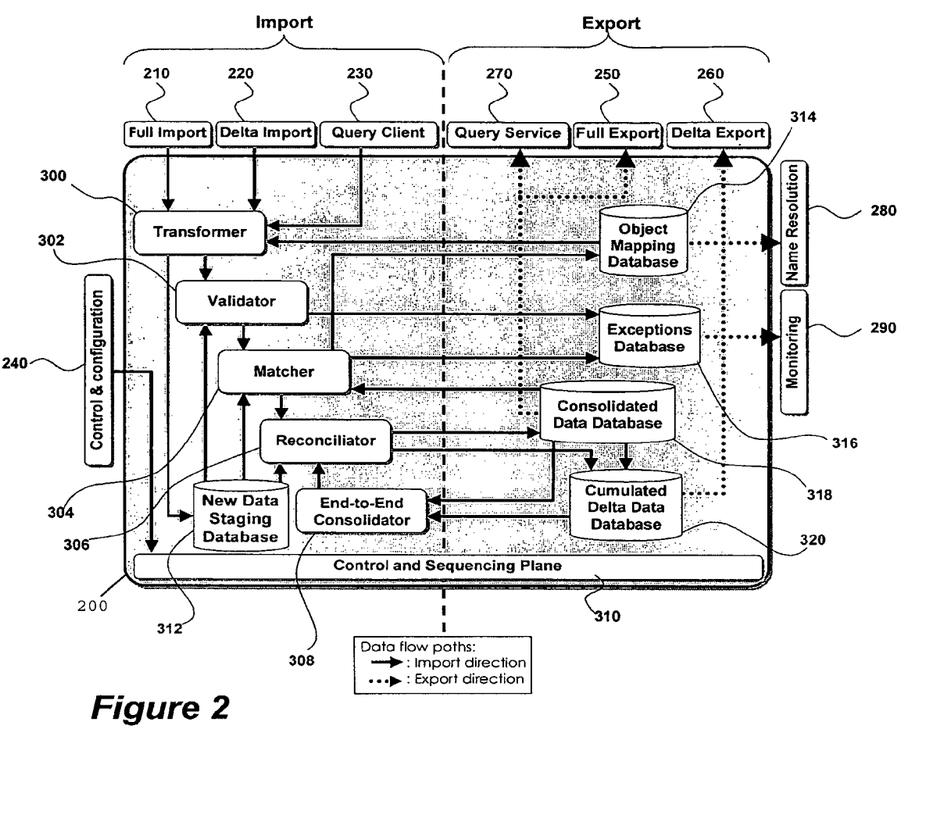
FIG. 2 shows a schematic diagram of a consolidator integration framework according to a second embodiment of the invention.

Referring to FIG. 2, a schematic diagram of a data consolidator according to a second embodiment of the invention is shown. The integration framework comprises a consolidator that is interfaced with three import data paths 210,220,230, a message-oriented control and configuration data path 240, three export data paths 250,260,270, a message-oriented name resolution data path 280, and a monitoring data path 290. The consolidator 200 comprises six configurable functional components 300,302,304,306,308,310 and five databases 312,314,316,318,320 arranged to consolidate data from the import paths 210,220,230,240 into a consistent and coherent representation, and to export that representation via the export paths 250,260,270,280,290 for use by other applications and/or consolidators.

The three import data paths are XML message-oriented and comprise a full import data path 210, a delta import data path 220, and a query client data path 230.

Similarly to the previous embodiment as described above, the full import data path 210 conveys a data stream containing full imports, and the delta import data path 220 conveys a data stream containing delta imports.

The query client data path 230 conveys a data stream requesting incoming data by querying different applications or consolidators and accepting query results as responses to these requests.

The control and configuration data path 240 conveys a data stream containing control messages that are used to synchronize dataload processes. Typically, this stream is used by the control workflows, but it may also be used to make configuration changes to any point in the architecture. The control and sequencing within the service controller layer is defined by the existing ISM Architecture, which is fully configurable according to rules, policies, transaction flows, etc.

The three export data paths are XML message-oriented and comprise a full export data path 250, a delta export data path 260, and a query service data path 270.

Similarly to the previous embodiment as described above, the full export data path 250 and the delta export data path 260 convey a data stream containing full exports and delta exports respectively.

The query service data path 270 conveys a data stream containing outgoing query data, which services request-response type queries by different applications or consolidators.

The name resolution data path 280 conveys messages necessary for synchronizing object naming across ISM applications. Typical messages could inform other applications about object creation or deletion.

The monitoring data path 290 conveys events to notify other applications about status and exceptional events. The monitoring messages may concern singular events or an entire batch of events. A batch notification could, for example, signify that a data loading process failed, and that the errors are indicated in a particular log-file. Such a message could be picked up by a fault system and used to notify operators, or alternatively the log file could be loaded and each entry processed individually.

It is noted that change events must be applied in the correct sequence and to the correct state. Consequently, a control infrastructure is used to organize the dataflow of the consolidator. The control and sequencing plane ensures consistency by synchronizing consolidator transactions with each other, for example synchronizing inputs with external requests to export the data. The control plane can be controlled internally by configuration of transactions within the existing ISM architecture (rules, policies, transaction flows, etc.) or externally through the control and configuration interface.

The nine data paths intersect a number of layers in an existing ISM adapter/controller architecture, and each intersection defines a point for configuring a re-usable component.

The architecture shown in FIG. 2 has six functional components, of a transformer 300, a validator 302, a matcher 304, a reconciliator 306, an end-to-end consolidator 308, and a control and sequencing plane 310. It is to be appreciated that the components indicated may be mapped into the functional areas of the consolidator 200. Accordingly, although the components are indicated as separate boxes, in alternative embodiments of the invention, the boxes may in fact represent functional features of the consolidator that are implemented by common hardware and/or software modules.

The architecture shown in FIG. 2 has five functional databases, of a new data staging database 312, an object mapping database 314, an exceptions database 316, a consolidated database 318, and a cumulated delta data database 320. The databases may be implemented using any suitable storage mechanism arranged to store the necessary data.

It is to be appreciated that the embodiment illustrated in FIG. 2 is simply one particular arrangement of functional areas and components. Thus, the internal arrangement of the consolidator 200 is not limited to that illustrated in FIG. 2 and it may be implemented in any such suitable way by configuring unique combinations of the data paths and components.

To implement the architectures above, a suitable existing consolidator can be used, with the addition of the provision of the four required data paths (full import, full export, delta import and delta export), in the form of compatible data paths so that they have the ability to match up in a hierarchy.

However, for a better understanding of the embodiment shown in FIG. 2, the arrangement of the functional components will now be described, purely by way of example, with reference to FIGS. 3 to 7. As detailed above, since the components can be implemented using COTS products and/or by a library of re-usable assets, it is noted that the components can be implemented differently and alternative solutions may be realized by configuring unique combinations of the components.

Figure 3:
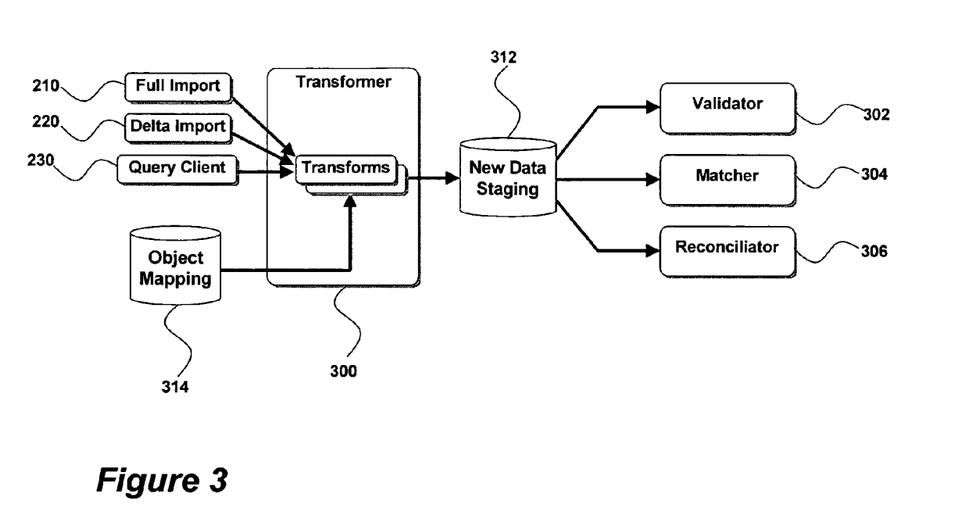
FIG. 3 illustrates the arrangement of the transformer component of FIG. 2.

Referring to FIG. 3, the arrangement of the transformer component according to the embodiment of FIG. 2 is illustrated. The transformer 300 is interfaced with the full import data path 210, the delta import path 220, the query service data path 230, and the object mapping database 314 to receive data and messages. When the structure and/or order of the incoming messages is very different from that required for the consolidated databases, the transformer 300 transforms the incoming messages into the required structure and/or order. Data is output from the transformer 300 to new data staging database 312 in order to be stored. The data staging database 312 also interfaces with the validator 302, matcher 304, and reconciliator 306 so that the data can be aggregated and extracted from the data staging database 312 in the appropriate order.

Figure 4:
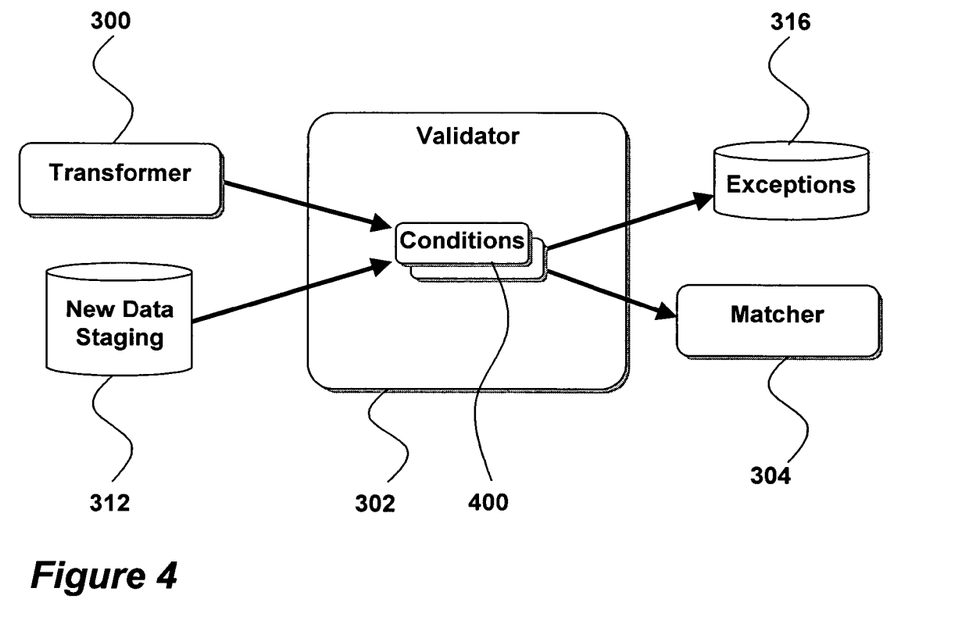
FIG. 4 illustrates the arrangement of the validator component of FIG. 2.

Referring to FIG. 4, the arrangement of the validator component of FIG. 2 is illustrated. The validator 302 is interfaced with the transformer 300 and the new data staging database 312 to receive imported data and transformed data. According to predetermined conditions 400, the validator 302 performs validation of the incoming data messages individually while also using information from the new data staging database 312. Thus, the validator 302 performs validation, removing input errors before messages are passed to further matching processes. Data validated by the validator 302 is output to the matcher 304 for further processing and errors are output to the exceptions database 316 to be stored.

Figure 5:
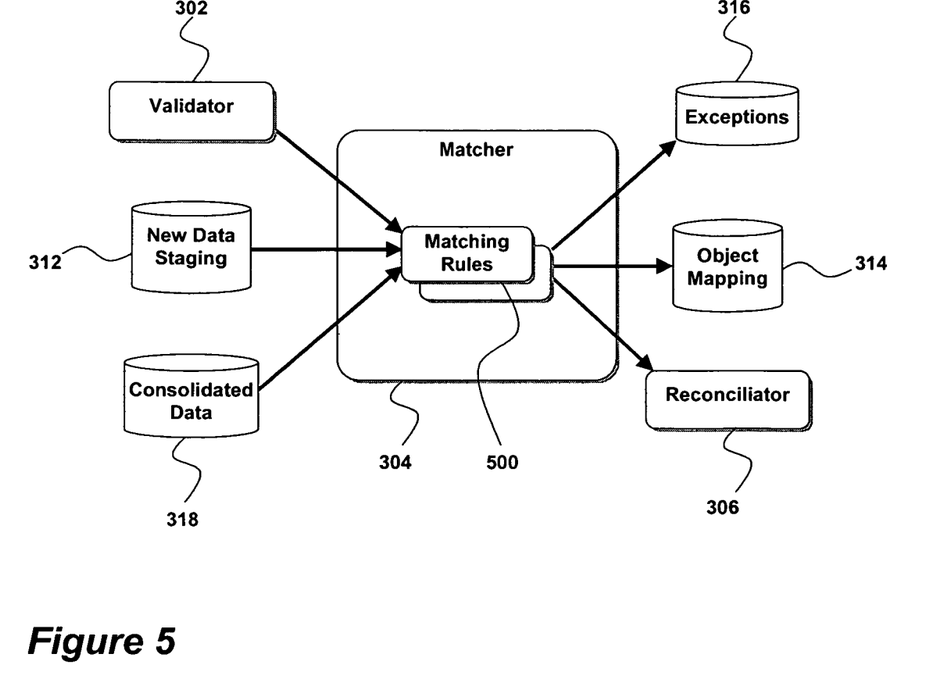
FIG. 5 illustrates the arrangement of the matcher component of FIG. 2.

Referring to FIG. 5, the arrangement of the matcher component of FIG. 2 is illustrated. The matcher 304 is interfaced with the validator 302, the new data staging database 312, and the consolidated data database 318 to receive validated data, transformed data, and existing consolidated data. According to predetermined matching rules 500, the matcher 304 identifies structures (objects, relations, attributes) in the received input data with structures in consolidated database 318 and outputs the resultant data to the exceptions database 316, the object mapping database 314, and the reconciliator 306. Identified structures are output object mapping database 314, and exceptions due to missing or inconsistent objects are output to the exceptions database 316.

Figure 6:
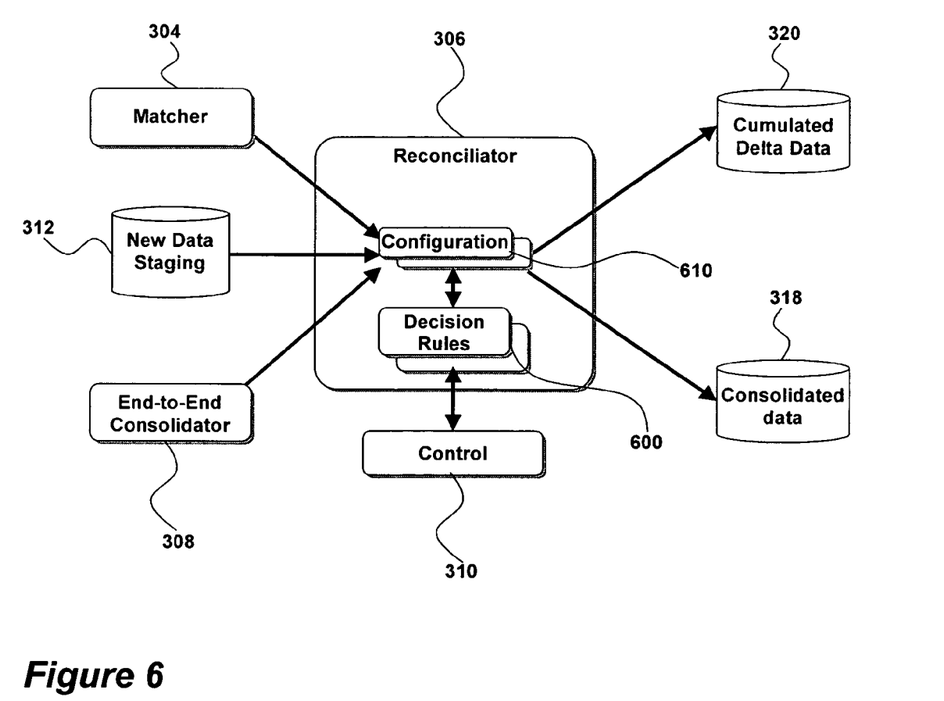
FIG. 6 illustrates the arrangement of the reconciliator component of FIG. 2.

Referring to FIG. 6, the arrangement of the reconciliator component of FIG. 2 is illustrated. The reconciliator 306 is interfaced with the matcher 304, the new data staging database 312, and the end-to-end consolidator 308 to receive matched data, transformed data, and consolidated data. The reconciliator 306 is also interfaced with the control and sequencing plane 310.

The reconciliator 306 compares the received data and makes reconciliation decisions on the handling of differences in the data. The reconciliation decisions are based upon a combination of reconciliation logs, predetermined decision rules 600 and configuration policies 610 within the reconciliator 306, and events (individual or bulk) exposed on the control interface via the interface with the control and sequencing plane 310. According to the reconciliation decisions, data is output from the reconciliator 306 to the consolidated data database 318, and delta data is output from the reconciliator 306 to the cumulated delta data database 320. For the case of full imports, the reconciliator 306 identifies and deletes objects that are no longer present from consolidated data database 318. For scoped full imports, only objects inside the scope are deleted.

Figure 7:
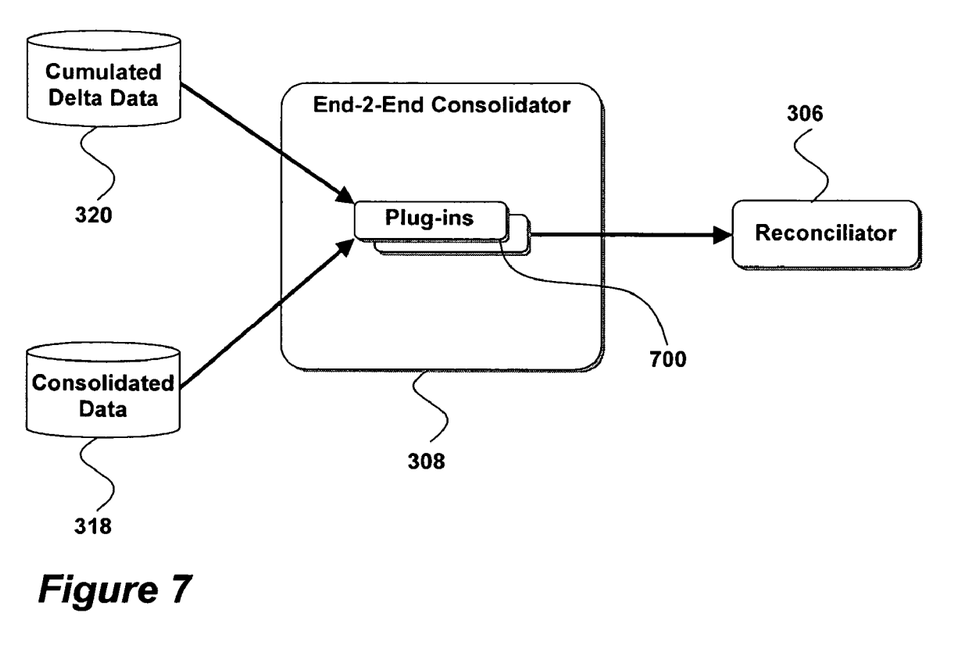
FIG. 7 illustrates the arrangement of the end-to-end consolidator component of FIG. 2.

Referring to FIG. 7, the arrangement of the end-to-end consolidator component of FIG. 2 is illustrated. The end-to-end consolidator 308 is interfaced with the cumulated delta data database 320 and the consolidated data database 318 to receive reconciliated data. According to predetermined plug-ins 700 within the end-to-end consolidator 308, the end-to-end consolidator 308 performs end-to-end service discovery and outputs discovered services to the reconciliator 306.

In alternative embodiments, the consolidated data database 318 may also be connected to a computer terminal or visual display unit to enable viewing and querying of the data stored in the consolidated database 318.

It is noted that the end-to-end consolidator 308 component is often only implemented for particular technologies, such as Synchronous Digital Hierarchy (SDH) for example. However, even though underlying applications and infrastructure elements, such as domain managers may have their own end-to-end discovery functionality, an end-to-end consolidator may be necessary for cross-domain and cross-vendor consolidation.

Figure 8:
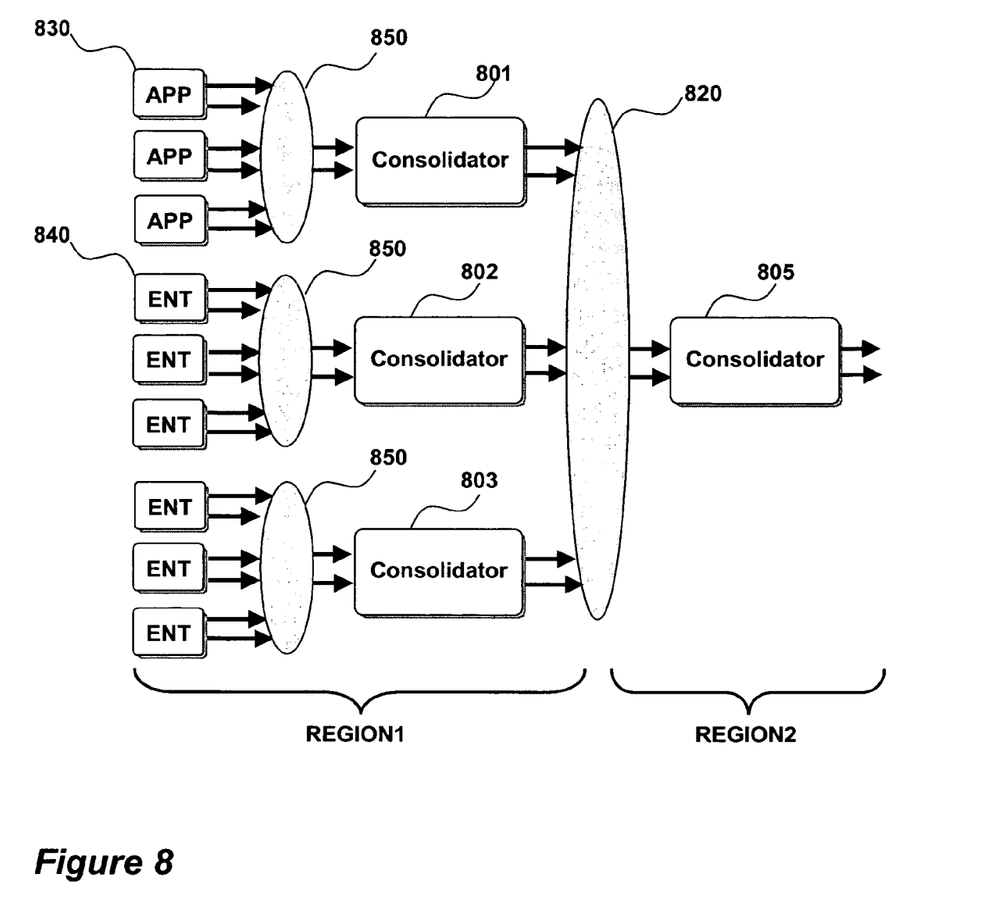
FIG. 8 illustrates a hierarchical arrangement of data consolidators according to an embodiment of the invention.

Referring to FIG. 8, a hierarchical arrangement of data consolidators according to an embodiment of the invention is illustrated. First to third regional data consolidators 801,802, 803 situated in a first geographical region REGION1 are interfaced with a central data consolidator 805 situated in a second geographical region REGION2 via a SDH network 820. The first to third regional data consolidators 801,802,803 are also interfaced with applications 830 or network enterprises 840 via an ATM network 850.

The regional data consolidators 801,802,803 and the central data consolidator 805 are implemented according to an embodiment of the invention, each comprising first and second import data paths, a consolidator, and first and second export paths.

The first regional data consolidator 801 is arranged such that its import paths support data exported by applications 830 via the ATM network 850. The second and third regional data consolidators 802,803 are arranged such that their import paths support data exported by network enterprises 840 via the ATM network 850.

The central data consolidator 805 is arranged such that its import paths support data exported by the regional data consolidators 801,802,803 via their export paths. In other words, the central data consolidator 805 is interfaced with the regional data consolidators 801,802,803 such that the import paths of the central data consolidator 805 receive data exported via the export paths of the regional data consolidators 801,802,803.

Thus, the regional data consolidators 801,802,803 produce consolidated data for the central data consolidator 805. This enables data consolidation using a hierarchical approach, allowing stacking in a distributed consolidation model to handle large geographical distribution.

In the arrangement illustrated, the export paths of the central data consolidator 805 are left unconnected. This is to indicate that the export paths may be interfaced with any such suitable applications or consolidation systems. By interfacing the export paths with import paths of a further data consolidator the central data consolidator 805 may implement a further regional consolidation system, adding a level of hierarchy to the consolidation model. As an example, large geographical regions may require a deep hierarchy, while small geographical regions may only require a shallow hierarchy.

It is to be appreciated that number of regions is arbitrary, thus any number of hierarchical levels can be provided. In addition, there may be several regional hierarchies, one for each technology, and cross-over between the technology hierarchies at each regional level. Thus, the provision of a multi-dimensional hierarchy is possible, not just a simple flat propagation hierarchy as illustrated in FIG. 8.

Returning to the illustrative example detailed above, the Berlin consolidator of the Telco can draw on already end-to-end consolidated and re-conciliated information about local connectivity being passed through a regional hierarchy of consolidators. If and when the same Telco moves into a different region, for example Asia, the Berlin consolidator can simply become another regional consolidator by straightforward configuration.

There exist numerous benefits of such a de-centralized paradigm, including: the improved performance of end-to-end consolidation; the ability to apply regional knowledge to regional reconciliation issues; and robustness against central server failure.

The data consolidation can be undertaken by large scale Network Service Providers and within Telecommunications applications. The concept of existing Integrated Service Management (ISM) frameworks can be extended to implement an open and highly configurable consolidator framework (which the ISM framework was not originally intended for).

Unlike existing Element Management System (EMS) and Network Management System (NMS) type applications, a hierarchical style consolidation paradigm can be enabled, whereby the data paths allow for stacking in a distributed consolidation model. Examples therefore allow existing COTS network inventory products to be integrated into a multi-layer data consolidation solution.

ETL products are well suited for integration using the approach described above, and ETL products may provide the generic application integration framework, on top of which the approach described above may be constructed.

A generic message-based Service Controller framework can be used together with a set of existing re-usable consolidator components as a framework for constructing data consolidation and reconciliation solutions.

It will be seen from the examples above that data consolidation can be integrated with Commercial-Off-The-Shelf (COTS) consolidation products while also being able to be stacked in a distributed, hierarchical consolidation model to handle large data volumes or geographical distribution.

Those skilled in the art will realize that the above embodiments are purely by way of example and that modification and alterations are numerous and may be made while retaining the teachings of the invention.

The invention claimed is:

1. A data consolidator comprising:
   a processor arranged to:
   receive and process input data comprising:
      import data of a first type comprising a complete set of data identified by defined criteria which replaces any previously existing data satisfying the defined criteria that is stored locally; and
      delta import data for transforming data of the first type, the delta import data comprising a set of data which can transform a subset of a previously existing complete set of data that is stored locally into a new complete set of data; and
   provide output data to a destination comprising:
      export data of the first type comprising a complete set of data identified by defined criteria which replaces any previously existing data satisfying the defined criteria that is stored at the destination; and
      delta export data for transforming data of the first type, the delta export data comprising a set of data which can transform a subset of a previously existing complete set of data that is stored at the destination into a new complete set of data,
      wherein the output data comprises consolidated import data of the first type;
   a transformer arranged to transform data into a required structure and/or order;
   a validator arranged to validate data and remove errors;
   a matcher arranged to identify structures within data according to predetermined matching rules;
   a reconciliator arranged to compare data and make reconciliation decisions on the handling of differences in the data;
   an end-to-end consolidator arranged to perform end-to-end service discovery according to predetermined plug-ins; and
   a control and sequencing plane arranged to synchronize consolidator transactions.

2. A data consolidator according to claim 1 wherein the first type of data comprises one or more of control data, query data, event data and name resolution data.

3. A data consolidator according to claim 1 wherein the consolidator further comprises:
   a new data staging database arranged to store transformed data;
   an object mapping database arranged to store matched data structures;
   an exceptions database arranged to store error data;
   a consolidated database arranged to store consolidated data; and
   a cumulated delta data database arranged to store delta data.

4. A computer implemented method of processing data comprising:
   importing data of a first type by a processor comprising a complete set of data identified by defined criteria which replaces any previously existing data satisfying the defined criteria that is stored locally;
   importing delta data by a processor for transforming data of the first type, the delta import data comprising a set of data which can transform a subset of a previously existing complete set of data that is stored locally into a new complete set of data;

consolidating the imported data, wherein consolidating the imported data comprises:
- transforming data into a required structure or order;
- validating data and removing errors;
- identifying structures within data according to predetermined matching rules;
- comparing data and making reconciliation decisions on the handling of differences in the compared data;
- performing end-to-end service discovery according to predetermined plug-ins; and
- synchronizing consolidator transactions;

exporting consolidated data of the first type by a processor to a destination, the exported consolidated data comprising a complete set of data identified by defined criteria which replaces any previously existing data satisfying the defined criteria that is stored at the destination; and exporting delta data by a processor for transforming data of the first type, the exported delta data comprising a set of data which can transform a subset of a previously existing complete set of data that is stored at the destination into a new complete set of data.

5. A computer implemented method according to claim 4, wherein the first type of data comprises one or more of control data, query data, event data and name resolution data.

6. A computer implemented method according to claim 4 further comprising:
- storing the transformed data;
- storing the identified data structures;
- storing the error data;
- storing consolidated data; and
- storing delta data.

7. A computer readable storage medium to store and/or record a computer program, the computer program causing a computer executing the program to perform the computer implemented method of claim 4.

8. A data consolidator arrangement comprising first and second data consolidators according to claim 1, wherein the first data consolidator is interfaced with the second data consolidator such that the output data of the first consolidator is input to the second consolidator.

9. A data consolidator arrangement comprising first, second, and third data consolidators according to claim 1, wherein the first data consolidator is interfaced with the second data consolidator such that the output data of the first consolidator is input to the second consolidator, and wherein the second consolidator is interfaced with the third consolidator such that the output data of the second consolidator is input to the third consolidator.

10. A data consolidator computer system having at least a processor coupled to memory, comprising:
- means for receiving input data comprising import data of a first type and delta import data for transforming data of the first type, the import data of the first type comprising a complete set of data identified by defined criteria which replaces any previously existing data satisfying the defined criteria that is stored locally, the delta import data comprising a set of data which can transform a subset of a previously existing complete set of data that is stored locally into a new complete set of data;
- means for consolidating the received input data; and
- means for providing output data comprising consolidated export data of the first type and delta export data for transforming data of the first type, the exported consolidated data comprising a complete set of data identified by defined criteria which replaces any previously existing data satisfying the defined criteria that is stored at the destination, the exported delta data comprising a set of data which can transform a subset of a previously existing complete set of data that is stored at the destination into a new complete set of data;
- means for transforming data into a required structure and/or order;
- means for validating data and removing errors;
- means for identifying structures within data according to predetermined matching rules;
- means for comparing data and making reconciliation decisions on the handling of differences in the data;
- means for performing end-to-end service discovery according to predetermined plug-ins; and
- means for synchronizing consolidator transactions.

11. A data consolidator computer system according to claim 10 further comprising means for performing end-to-end consolidation.

12. A data consolidator computer system according to claim 10 further comprising means for performing data reconciliation.

13. A data consolidator computer system according to claim 10 further comprising:
- means for storing transformed data;
- means for storing matched data structures;
- means for storing error data;
- means for storing consolidated data; and
- means for storing delta data.

* * * * *